United States Patent [19]

Yamamoto et al.

[11] Patent Number: 4,787,258
[45] Date of Patent: Nov. 29, 1988

[54] CONTROL SYSTEMS FOR AUTOMATIC TRANSMISSIONS

[75] Inventors: Koichi Yamamoto, Hiroshima; Fumiaki Baba, Higashihiroshima, both of Japan

[73] Assignee: Mazda Motor Corporation, Japan

[21] Appl. No.: 32,611

[22] Filed: Mar. 31, 1987

[30] Foreign Application Priority Data

Apr. 3, 1986 [JP] Japan .................. 61-77090

[51] Int. Cl.$^4$ ...................... B60K 41/18; B60K 41/16
[52] U.S. Cl. ......................................... 74/866; 74/869
[58] Field of Search .......................... 74/866, 869, 868

[56] References Cited

U.S. PATENT DOCUMENTS

| | | | |
|---|---|---|---|
| 4,319,501 | 3/1982 | Sugimoto | 74/866 |
| 4,617,841 | 10/1986 | Sugano | 74/869 |
| 4,665,774 | 5/1987 | Oguri | 74/868 |
| 4,680,992 | 7/1987 | Hayasaki et al. | 74/869 |

FOREIGN PATENT DOCUMENTS

| | | | |
|---|---|---|---|
| 0147949 | 11/1981 | Japan | 74/866 |
| 59-183160 | 10/1984 | Japan . | |

*Primary Examiner*—Dirk Wright
*Attorney, Agent, or Firm*—Gerald J. Ferguson, Jr.

[57] ABSTRACT

A control system for automatic transmission employed in vehicle comprises a torque converter coupled with an engine, a power transmitting gear arrangement coupled with the torque converter, a speed change device for giving rise to speed change in the power transmitting gear arrangement, a valve arrangement for controlling an operation fluid to be supplied to and drained from the speed change device, a revolving speed sensor for detecting the revolving speed of an input or output portion of the power transmitting gear arrangement when the shifting-down to a low speed with which an engine brake effect is to be obtained from a high speed in the power transmitting gear arrangement is carried out, and a control device for selecting, as the low speed of a target of the shifting-down, a first low speed with which the engine brake effect can be obtained and a second low speed with which the engine brake effect can not be obtained alternatively in response to the revolving speed detected by the revolving speed sensor. The control device selects further the first low speed after the second low speed is selected for a predetermined period of time on the occasion of the shifting-down.

7 Claims, 3 Drawing Sheets

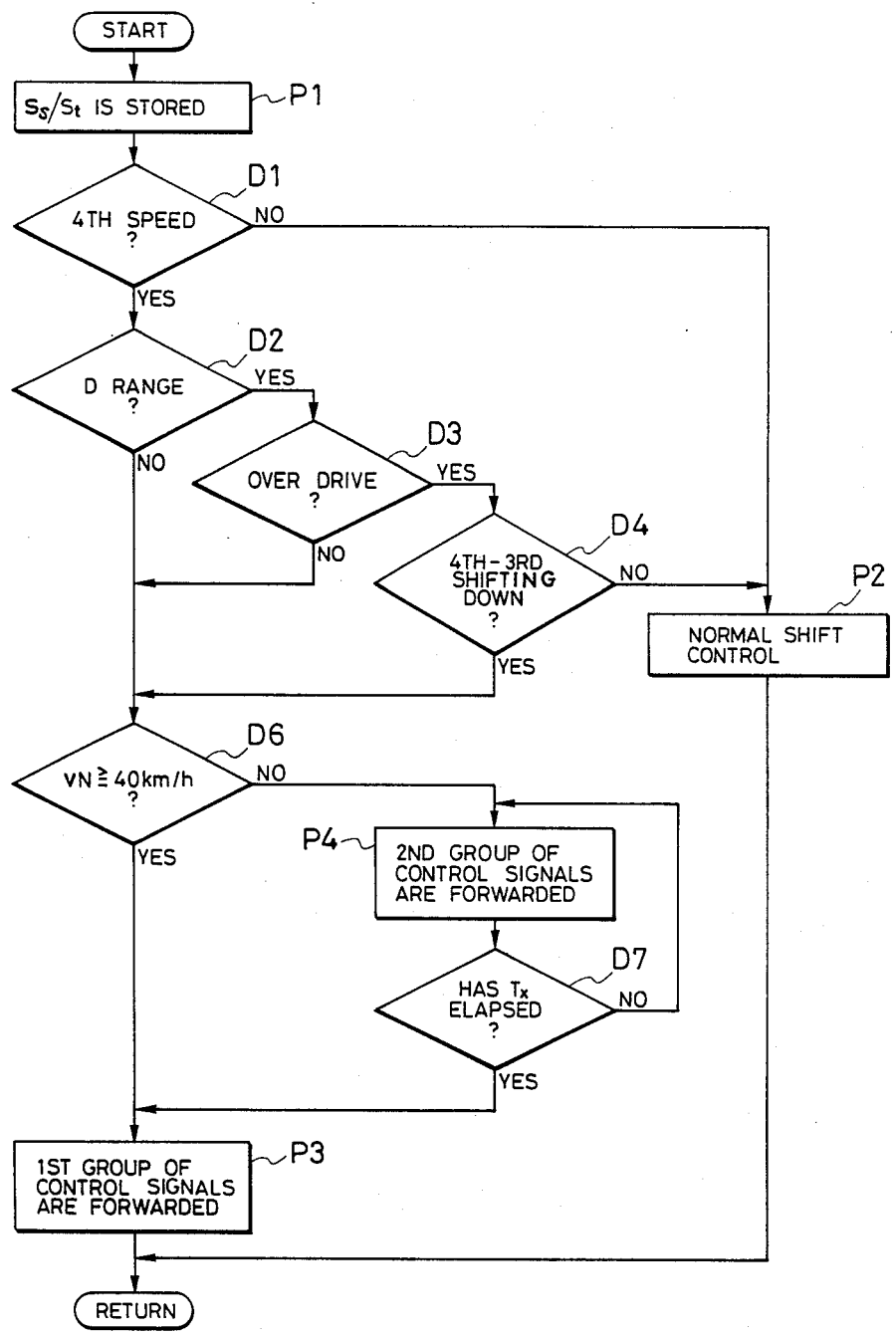

CONTROL SYSTEMS FOR AUTOMATIC TRANSMISSIONS

BACKGROUND OF THE INVENTION

1. Field of the Invention

The present invention relates generally to control systems for automatic transmissions employed in vehicles, and more particularly, to a system for controlling an automatic transmission provided in a vehicle to have a speed position selected automatically in accordance with the operating condition of an engine employed in the vehicle and the travelling condition of the vehicle.

2. Description of the Prior Art

There has been commonly used in vehicles an automatic transmission which comprises a torque converter coupled with an output shaft of an engine, a power transmitting gear arrangement including a planetary gear mechanism connected to an output shaft of the torque converter, a speed change mechanism including clutch and brake elements and operative to switch over power transmitting paths from one to another in the power transmitting gear arrangement so that speed change is carried out, a hydraulic servo control device provided in an oil hydraulic control circuit for causing the speed change mechanism to work, and a valve arrangement for controlling an operation oil to be supplied to and drained from the speed change mechanism and the hydraulic servo control device. The valve arrangement is operative to cause the hydraulic servo control device to act on the speed change mechanism in response to the operating condition of the engine and the travelling condition of the vehicle, so that the speed change mechanism works to switch over the power transmitting paths from one to another in the power transmitting gear arrangement under the control by the hydraulic servo control device.

For such an automatic transmission employed in the vehicle, it is desired that the shock of great degree, which may arise on the occasion of, for example, a kickdown operation in which the speed is shifted down in the power transmitting gear arrangement, is avoided and in addition a superior responsibility for speed changes is obtained. For fulfilling these desires, it is required that the timing of each speed change is adjusted appropriately in accordance with the operating condition of the engine and the travelling condition of the vehicle.

In view of this, for example, as disclosed in examination under publication number 59/183160, there has been proposed a control device for an automatic transmission in which a control valve mechanism for controlling the velocity of an oil flowing into or from a hydraulic servo control device which has an applying chamber and a releasing chamber to each of which the oil is supplied and is operative to cause a speed change mechanism comprising friction elements to work for changing a power transmitting path in a power transmitting gear arrangement, so as to control the acting speed of the hydraulic servo control device, is provided with the intention of adjusting the timing of each speed change caused by the speed change mechanism in response to the operating condition of an engine.

In the automatic transmission to which the above described control device is applied, there is still a further problem that another shock contingent to an engine brake effect is caused upon the speed change when the shifting-down to a low speed with which the engine brake effect is obtained from a high speed is carried out in the power transmitting gear arrangement. For avoiding this problem, it is considered to diminish thoroughly the engine brake effect on the occasion of each shifting-down. However, in practice, the engine brake effect is essentially required especially in the case where the shifting-down in the power transmitting gear arrangement is performed so as to cause a vehicle travelling at high speed to be slowed down and therefore it should not be realized to diminish thoroughly the engine brake effect generally.

OBJECTS AND SUMMARY OF THE INVENTION

Accordingly, it is an object of the present invention to provide a control system for an automatic transmission which avoids the aforementioned problems encountered with the prior art.

Another object of the present invention is to provide a control system for an automatic transmission employed in a vehicle, wherein the shifting-down to a low speed with which an engine brake effect can be obtained from a high speed in a power transmitting gear arrangement is so performed that the shock contingent to the engine brake effect can be effectively moderated.

A further object of the present invention is to provide a control system for an automatic transmission employed in a vehicle, wherein the shifting-down to a low speed with which an engine brake effect can be obtained from a high speed in a power transmitting gear arrangement can be performed with the shock contingent to the engine brake effect to be moderated sufficiently and a useful engine brake effect under a situation wherein the vehicle travels at high speed.

According to the present invention, there is provided a control system for an automatic transmission employed in a vehicle comprising a torque converter coupled with an output shaft of an engine, a power transmitting gear arrangement disposed at an output end of the torque converter, a speed change mechanism for changing over power transmitting paths to one from another in the power transmitting gear arrangement to give rise to speed change, a valve arrangement for controlling an operation oil to be supplied to and drained from the speed change mechanism, a revolving speed sensor for detecting the revolving speed of an input or output portion of the power transmitting gear arrangement when the shifting-down to a low speed with which an engine brake effect is to be obtained from a high speed in the power transmitting gear arrangement is carried out, and a control device for selecting directly a first low speed with which an engine brake effect can be obtained as the low speed of a target of the shifting-down when the revolving speed detected by the revolving speed sensor is equal to or higher than a predetermined revolving speed, and for selecting a second low speed, which is provided with the same speed reduction ratio as the first low speed and with which the engine brake effect can not be obtained, as the low speed of a target of the shifting-down for a predetermined period of time and then making a shift from the second low speed to the first low speed when the revolving speed detected by the revolving speed sensor is lower than the predetermined revolving speed.

With the control system for an automatic transmission thus constituted in accordance with the present invention, in the case where the vehicle travelling speed is equal to or higher than a predetermined speed on the occasion of the shifting-down to a low speed with which the engine brake effect is to be obtained from a high speed in the power transmitting gear arrangement, the first low speed with which the engine brake effect can be obtained is directly selected as the low speed of a target of the shifting-down, and therefore the shifting-down is performed with the engine brake effect contributive for reducing appropriately the vehicle travelling speed. Further, in the case where the vehicle travelling speed is lower than the predetermined speed on the occasion of the shifting-down to a low speed with which the engine brake effect is to be obtained from a high speed in the power transmitting gear arrangement, the second low speed with which the engine brake effect can not be obtained is selected as the low speed of a target of the shifting-down for the predetermined period of time and then changed into the first low speed with which the engine brake effect can be obtained, and therefore the shifting-down is completed without the shock contingent to the engine brake effect.

The above, and other objects, features and advantages of the present invention will become apparent from the following detailed description which is to be read in conjunction with the accompanying drawings.

BRIEF DESCRIPTION OF THE DRAWINGS

FIG. 3 is a flow chart showing an example of an operational program for a microcomputer used in a controller employed in the oil hydraulic control circuit arrangement shown in FIG. 2.

DESCRIPTION OF THE PREFERRED EMBODIMENTS

The invention will now be described by way of example with reference to the accompanying drawings.

Figure 1:
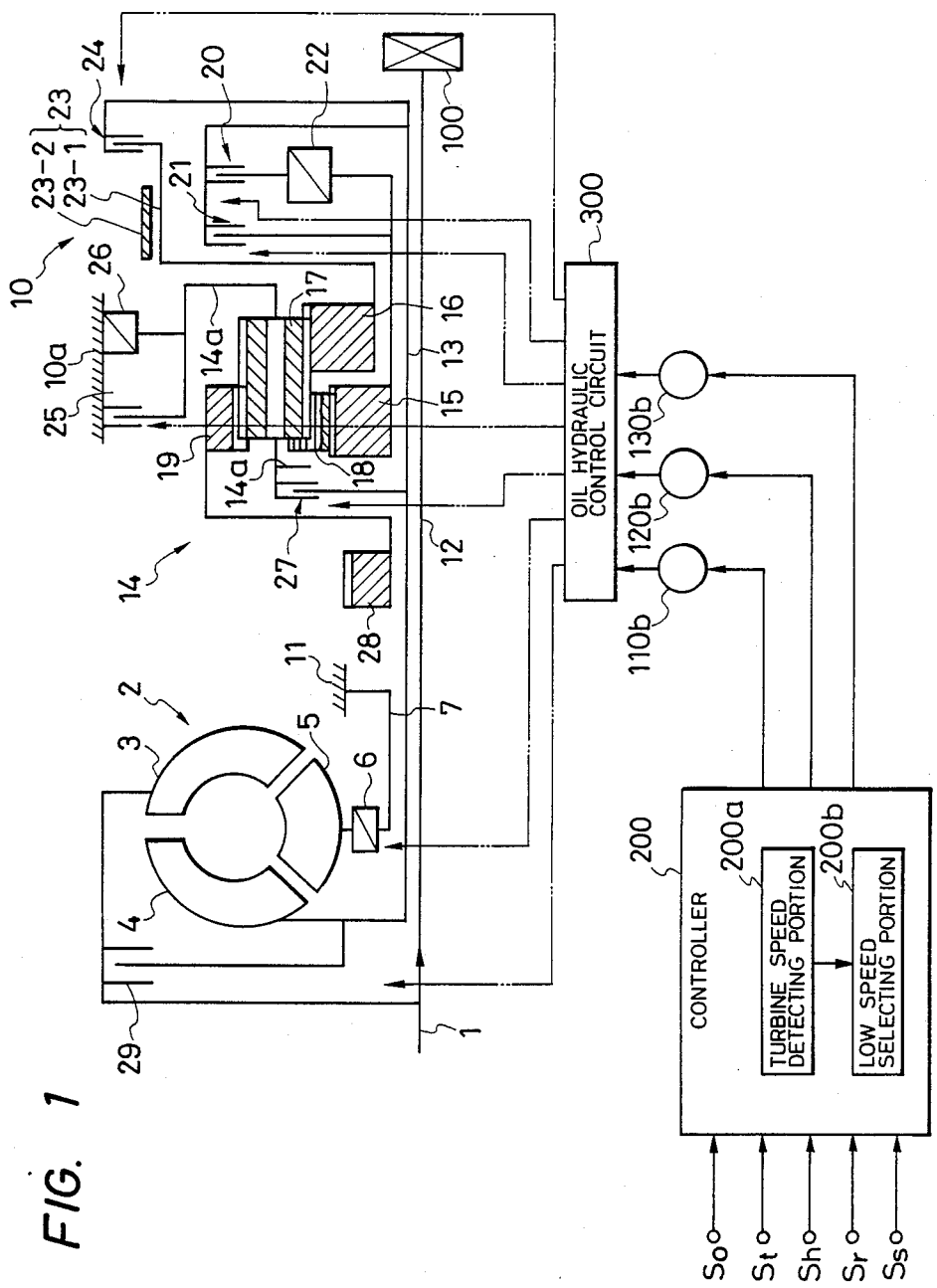
FIG. 1 is a schematic illustration showing an example of an automatic transmission to which one embodiment of control system for an automatic transmission according to the present invention is applied.

Referring to FIG. 1, an automatic transmission employed in a vehicle comprises a torque converter 2 coupled with an output shaft 1 of an engine and a power transmitting gear arrangement 10 connected to an output end of the torque converter 2.

The torque converter 2 includes a pump impeller 3, a turbine runner 4 and a stator 5, and the pump impeller 3 is secured to the output shaft 1. The stator 5 is coupled rotatably through a one-way clutch 6 with a fixed shaft 7 incorporated with a case 11 of the power transmitting gear arrangement 10. The one-way clutch 6 permits the stator 5 to revolve only in a direction common to the rotation of the pump impeller 3.

The power transmitting gear arrangement 10 includes a central shaft 12 which has one end thereof connected to the output shaft 1 of the engine and elongates to pass through a central part of the arrangement 10 and engage at the other end thereof with an oil pump 100 disposed on a side wall of the arrangement 10. Further, a tubular turbine shaft 13 is disposed to surround the central shaft 12. One end of the tubular turbine shaft 13 is coupled with the turbine runner 4 and the other end of the tubular turbine shaft 13 reaches to the side wall of the arrangement 10 to be supported rotatably by the same.

One the tubular turbine shaft 13, a planetary gear unit 14 comprising a small sun gear 15, a large sun gear 16 disposed behind the small sun gear 15 with a short distance between, a long pinion gear 17, a short pinion gear 18 and a ring gear 19 is mounted. Further, first and second clutch devices 20 and 21 are disposed behind the planetary gear unit 14 on the tubular turbine shaft 13. The first clutch device 20 is provided for forward driving and operative to make selectively power transmission through a one-way clutch device 22 between the tubular turbine shaft 13 and the small sun gear 15. The second clutch device 21 is operative to making selectively another power transmission between the tubular turbine shaft 13 and the small sun gear 15. A first brake device 23 is disposed at the outside of second clutch device 21. The first brake device 23 is formed into a band brake having a brake drum 23-1 connected to the large sun gear 16 and a brake band 23-2 engaged with the brake drum 23-1. A third clutch device 24 is disposed at the outside of the first clutch device 20 and on the side of the first brake device 23. The third clutch device 24 is provided for backward driving and operative to making selectively power transmission through the brake drum 23-1 of the first brake device 23 between the tubular turbine shaft 13 and the large sun gear 16.

At the outside of the planetary gear unit 14, a second brake device 25 is provided for engaging selectively a carrier 14a of the planetary gear unit 14 with a case 10a of the power transmitting gear arrangement 10. Between the first and second brake devices 23 and 25, a second one-way clutch device 26 is provided in parallel with the second brake device 25 for engaging selectively the carrier 14a of the planetary gear unit 14 with the case 10a of the power transmitting gear arrangement 10.

A fourth clutch device 27 is disposed in front of the planetary gear unit 14 for making selectively power transmission between the tubular turbine shaft 13 and the carrier 14a of the planetary gear unit 14. Further, an output gear 28 connected to the ring gear 19 is disposed in front of the fourth clutch device 27 to be coupled with an output shaft.

The tubular turbine shaft 13 is so arranged as to be coupled through a lock-up device 29 with the output shaft of the engine without passing through the torque converter 2, as occasion demands.

The automatic transmission, which includes the mechanical parts arranged in the manner as described above, also has an oil hydraulic control circuit arrangement associated therewith. The oil hydraulic control circuit arrangement comprises a controller 200 containing a turbine speed detecting portion 200a and a low speed selecting portion 200b, solenoid valves 110b, 120b and 130b each of which operates under the control by the controller 200, and an oil hydraulic control circuit 300 which is controlled by the solenoid valves 110b, 120b and 130b to supply an operation oil to and to drain the operation oil from various portions of the mechanical parts arranged as described above. The controller 200 is supplied with an overdrive indicating signal So obtained from an overdrive detector, input shaft speed signal St obtained from a turbine speed sensor, throttle opening degree signal Sh obtained from a throttle sensor, shift position signal Sr obtained from a shift position sensor, and a vehicle travelling speed signal Ss obtained from a speed sensor which detects the vehicle travelling speed based on the revolving speed of the central shaft 12.

The power transmitting gear arrangement 10 constituted as described above provides four forward speeds and one backward speed, and the automatic transmission comprising the torque converter 2, the power transmitting gear arrangement 10, and the oil hydraulic control circuit arrangement can provide a large number of speeds at a plurality of shift ranges arranged ordinarily by causing the first to fourth clutch devices 20, 21, 24 and 27, and the first and second brakes devices 23 and 25 to work selectively.

In the following Table 1, there are given the relationship in operation of the respective shift ranges with the clutches and the brakes in the above configuration;

TABLE 1

| Shift position | Clutch | | | | Brake | | One-way | Clutch |
|---|---|---|---|---|---|---|---|---|
| | 24 | 20 | 21 | 27 | 25 | 23 | 26 | 22 |
| P | | | | | | | | |
| R | 0 | | | | | 0 | | |
| N | | | | | | | | |
| D first speed | | 0 | 0 | | | | (0) | (0) |
| second speed | | 0 | 0 | | | 0 | | (0) |
| third speed | | 0 | 0 | 0 | | | | (0) |
| overdrive | | | 0 | 0 | 0 | | | |
| 2nd | | | | | | | | |
| first speed | | 0 | 0 | | | | (0) | (0) |
| Second speed | | 0 | 0 | | | 0 | | (0) |
| third speed | | 0 | 0 | 0 | | | | (0) |
| 1st | | | | | | | | |
| first speed | | 0 | 0 | | 0 | | (0) | (0) |
| second speed | | 0 | 0 | | | 0 | | (0) |

Figure 2:
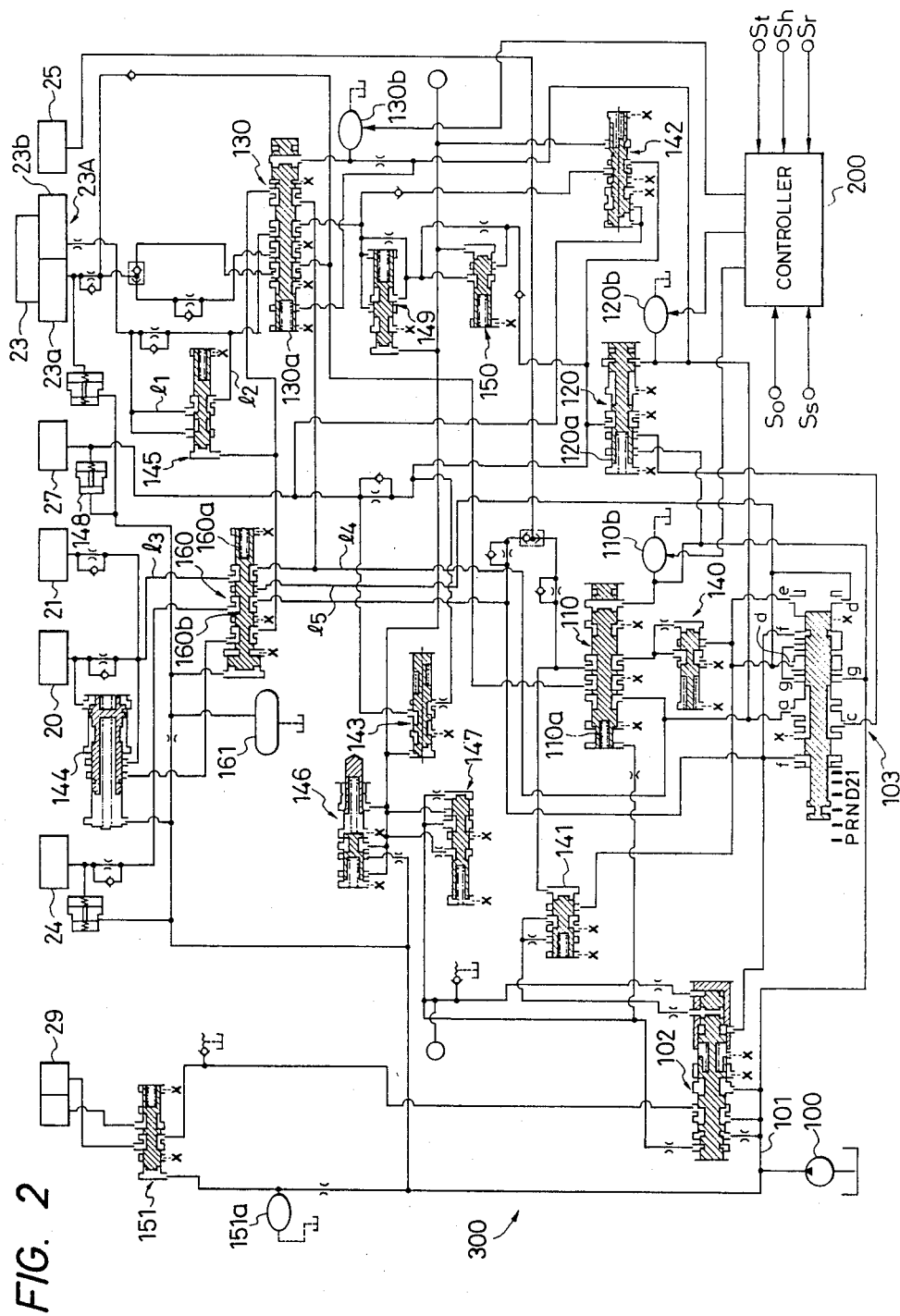
FIG. 2 is a sectional view showing an example of an oil hydraulic control circuit arrangement of the automatic transmission to which the embodiment of control system according to the present invention is applied.

FIG. 2 shows an example of the oil hydraulic control circuit arrangement used for the automatic transmission shown in FIG. 1 and described above.

In this example, the oil hydraulic control circuit 300 includes the oil pump 100 adapted to be driven by the central shaft 12 which serves as an output shaft of the power transmitting gear arrangement 10 and an operation oil is discharged from the oil pump 100 into a pressure line 101. The operation oil discharged into the pressure line 101 is led to a pressure regulator valve 102 to be adjusted in pressure therein in accordance with a control signal from the controller 200 and then passed into a selector valve 103 through a port g thereof.

The selector valve 103 is a manual shift valve having the 1st, 2nd, D, N, R and P shift positions to be selected manually and also ports a, c, d, e, and f in addition to the port g. The port g is permitted to communicate with the ports a, d and e, when the selector valve 103 is in the 1st shift position, with the ports a, c and d when the selector valve 103 is in the 2nd shift position, with the ports a and c when the selector valve 103 is in the D shift position, and with the port f when the selector valve 103 is in the R shift position.

The port a of the selector valve 103 is connected to a 1-2 shift valve 110 for supplying thereto with the operation oil against a spring 110a provided therein. The 1-2 shift valve 110 is put in the 1st shift position when the solenoid valve 110b is deenergized and in the 2nd shift position when the solenoid valve 110b is energized. The operation oil discharged from the port a of the selector valve 103, for example, under the situation wherein the selector valve 103 is in the D shift position, is supplied through, the 1-2 shift valve 110 to an applying chamber 23a of a hydraulic servo control device 23A which is provided for causing the first brake device 23 to operate when the solenoid valve 110b is energized so that the speed change to the second speed from the third speed is carried out. In the case where the solenoid valve 110b is deenergized under the situation wherein the selector valve 103 is in the D shift position, the operation oil discharged from the port a of the selector valve 103 bypasses the 1-2 shift valve 110 to be supplied to the first and second clutch devices 20 and 21, so that the first speed is selected.

Further, the 1-2 shift valve 110 is operative to supply the operation oil which is introduced thereto through a pressure reducing valve 140 from the port e of the selector valve 103 to the second brake device 25 and also a signal pressure to a throttle backup valve 141 when the second speed is selected under the situation wherein the selector valve 103 is in the 1st shift position.

The port a of the selector valve 103 is also connected to a 2-3 shift valve 120 for supplying thereto with the operation oil against a spring 120a provided therein. The 2-3 shift valve 120 is put in the 2nd shift position when the solenoid valve 120b is energized and in the 3rd shift position when the solenoid valve 120b is deenergized. In the case where the speed change to the third speed from the second speed is carried out, the operation oil discharged from the port c of the selector valve 103 is supplied through a servo control valve 142 and a 2-3 timing valve 143 to the fourth clutch device 27 to engage the same and also to the releasing chamber 23b of the hydraulic servo control device 23A so as to disengage the first brake device 23.

The port a of the selector valve 103 is further connected to a 3-4 shift valve 130 for supplying thereto with the operation oil against a spring 130a provided therein. The 3-4 shift valve 130 is put in the 3rd shift position when a solenoid valve 130b is deenergized and in the 4the shift position (overdrive position) when the solenoid valve 130b is energized. When the 3-4 shift valve 130 is in the 3rd shift position, the operation oil having passed through the 1-2 shift valve 110 is supplied to the applying chamber 23a of the hydraulic servo control device 23A without passing through any orifice and the operation oil discharged from the port a of the selector valve 103 to bypass the 1-2 shift valve 110 is supplied through the 3-4 shift valve 130 and an N-D accumulator 144 to the first and second clutch devices 20 and 21.

When the solenoid valve 130b is energized to drain the operation oil from the 3-4 shift valve 130, the operation oil having passed through the 1-2 shift valve 110 is supplied through a line provided with an orifice and a check valve to the applying chamber 23a of the hydraulic servo control device 23A, and the speed change to the fourth speed from the third speed is performed. Simultaneously, the operating oil in the releasing chamber 23b of the hydraulic servo control device 23A is drained through an orifice and a 3-4 capacity valve 145 so as to engage the first brake device 23, and the operating oil acting on the second clutch device 21 is also drained so that the second clutch device 21 is disengaged.

The pressure reducing valve 140 receives the operation oil discharged from the port e of the selector valve 103 to reduce the pressure of the same by self-adjusting function and supplies the operation oil reduced in pressure to the 1-2 shift valve 110 when the selector valve 103 is in the 1st shift position. The operation oil thus supplied to the 1-2 shift valve 110 is supplied therethrough to the second brake device 25 when the first speed is selected. Since the operation oil which is supplied through the 1-2 shift valve 110 to the second brake device 25 is reduced in pressure by the pressure reducing valve 140, the shock caused on the occasion of the speed change is moderated. The pressure reducing valve 140 is operative also to supply the operation oil having passed through the 1-2 shift valve 110 to the throttle backup valve 141 as the signal pressure, but is not caused to work when the selector valve 103 is in the D shift position.

The throttle backup valve 141 receives the signal pressure from the pressure reducing valve 140 to cause the same to act against the pressure by a spring contained therein, and supplies the operation oil discharged from the port d of the selector valve 103 to the pressure regulator valve 102 only when the signal pressure supplied from the pressure reducing valve 140 acts practically against the pressure by the spring contained therein. Accordingly, the throttle backup valve 141 is operative to supply the operation oil discharged from the port d of the selector valve 103 to the pressure regulator valve 102 for increasing the pressure of the operation oil so that an engine braking operation is obtained effectively when the selector valve 103 in the 1st or 2nd shift position and in addition the signal pressure is not supplied to the throttle backup valve 141.

The pressure regulator valve 102 is connected through a throttle modulator valve 147 to a throttle valve 46. The throttle valve 146 works in conjunction with an accelerator so as to produce a hydraulic pressure in proportion to the opening degree of a throttle (the throttle opening degree). The throttle modulator valve 147 reduces appropriately the hydraulic pressure produced by the throttle valve 146 and supplies the reduced hydraulic pressure to the pressure regulator valve 102 so that a hydraulic pressure which matches the engine torque is obtained.

The servo control valve 142 and the 2-3 timing valve 143 are provided for moderating the shock arising on the occasion of the speed change to the third speed from the second speed. In the event of the speed change to the third speed from the second speed, it is required that the fourth clutch device 27 is engaged and the first brake device 23 is disengaged and therefore the operation oil is supplied to both the fourth clutch device 27 and the releasing chamber 23b of the hydraulic servo control device 23A. However, in such case, since an orifice and an accumulator 148 are provided in a line for supplying the operation oil to the fourth clutch device 27 for the purpose of reducing the shock resulting from the engagement of the fourth clutch device 27, the operation oil which is supplied to the fourth clutch device 27 is apt to be delayed to affect with a proper hydraulic pressure on the fourth clutch device 27 and therefore it is feared that the timing of the engagement of the fourth clutch device 27 is undesirably delayed. Accordingly, the servo control valve 142 is provided in a line for supplying the operation oil to the releasing chamber 23b of the hydraulic servo control device 23A so as to receive the hydraulic pressure from the fourth clutch device 27 and prevent the operation oil from acting to the releasing chamber 23b of the hydraulic servo control device 23A until the hydraulic pressure from the fourth clutch device 27 becomes relatively high.

The 2-3 timing valve 143 is operative to control the timing of the engagement of the fourth clutch device 27 in response to the throttle opening degree, so as to moderate the shock which is caused on the occasion on the speed change and unable to be moderated by the servo control valve 142. In fact, in the event of such a shifting up to the third speed from the second speed as arising when the throttle is returned quickly to reduce its opening degree at a relatively small opening degree, a quick engagement of the fourth clutch device 27 would give rise to a shock. In view of this, the 2-3 timing valve 143 is arranged for controlling the fourth clutch device 27 to have a relatively long engaging time when the throttle opening degree is small and a relatively short engaging time when the throttle opening degree is large.

The 3-4 capacity valve 145 is provided for moderating the shock arising on the occasion of the shift-up to the fourth speed from the third speed. When the operation oil in the 3-4 shift valve 130 is drained through the solenoid valve 130b which is energized so that the 3-4 shift valve 130 is shifted to the 4th shift position from the 3rd shift position and therefore the operation oil in the second clutch device 21 and the operation oil in the releasing chamber 23b of the hydraulic servo control device 23A are drained respectively, the drain of the operation oil from the releasing chamber 23b of the hydraulic servo control device 23A is controlled by the 3-4 capacity valve 145 so that the above mentioned shock is moderated. In the 3-4 capacity valve 145, a spool is placed at such a position as shown in FIG. 1 to connect a line $l_1$ with a line $l_2$ at the beginning of a period of the drain of the operation oil from the releasing chamber 23b. Therefore, the operation oil from the releasing chamber 23b is drained through the 3-4 capacity valve 145. Then, when the drain of the operation oil from the releasing chamber 23b is advanced to a certain degree, the spool in the 3-4 capacity valve 145 is moved to the left in the drawing to disconnect the line $l_1$ from the line $l_2$ and accordingly the operation oil from the releasing chamber 23b is drained through an orifice. Under such a control by the 3-4 capacity valve 145, the hydraulic pressure in the releasing chamber 23b of the hydraulic servo control device 23A is reduced rapidly at the beginning of the period of the drain of the operation oil from the releasing chamber 23b and then further reduced gradually during that period of the drain. Consequently, the first brake device 23 is controlled by the hydraulic servo control device 23A to have a relatively long engaging time, so that the shock resulting from the engagement of the first brake device 23 is moderated.

A 3-2 capacity valve 149 and a 3-2 timing valve 150 are provided for moderating the shock arising on the occasion of the shift-down to the second speed from the third speed in response to the throttle opening degree. In the 3-2 capacity valve 149, the hydraulic pressure from the throttle modulator valve 147 is applied to act against the total amount of the hydraulic pressure produced by a spring contained in the 3-2 capacity valve 149 and the hydraulic pressure of the drain of the operation oil from the releasing chamber 23b of the hydraulic servo control device 23A. Therefore, the drain of the operation oil from the releasing chamber 23b of the hydraulic servo control device 23A is controlled by the 3-2 capacity valve 149 in such a manner that the operation oil from the releasing chamber 23b is drained through the 3-2 capacity valve 149 at the beginning of the period of the drain of the operation oil from the releasing chamber 23b and then further drained through an orifice. The operation oil drained from the 3-2 capacity valve 149 is controlled through the 3-2 timing valve 150 by the 2-3 shift valve 120.

In the 3-2 timing valve 150, the hydraulic pressure from the throttle modulator valve 147 acts against the hydraulic pressure produced by a spring contained in the 3-2 timing valve 150. The operation oil having passed through or bypassed the 3-2 capacity valve 149 is drained through an orifice when the hydraulic pressure from the throttle modulator valve 147 is higher than the hydraulic pressure produced by the spring contained in the 3-2 timing valve 150 and drained through the 3-2 timing valve 150 when the hydraulic pressure from the throttle modulator valve 147 is equal to or lower than the hydraulic pressure produced by the spring contained in the 3-2 timing valve 150. In the situation wherein the hydraulic pressure from the throttle modulator valve 147 is higher than the hydraulic pressure produced by the spring contained in the 3-2 timing valve 150 and therefore the operation oil passes through the orifice, the operation oil from the releasing chamber 23b of the hydraulic servo control device 23A is drained gradually through the orifice. As a result, the first brake device 23 is controlled to have has a relatively long engaging time, so that the shock resulting from the engagement of the first brake device 23 is moderated.

The operation of each of the solenoid valves 110b, 120b and 130b are controlled by the controller 200 which is constituted with, for example, a microcomputer, in response to at least one of the operating condition of the engine and the travelling condition of the vehicle. The controller 200 produces shifting-up and shifting-down control signals selectively based on the signals So, St, Sh, Sr and Ss and forwards the shifting-up or shifting-down control signal to the solenoid valves 110b, 120b and 130b when the speed change is carried out.

Further, for the purpose of moderating effectively the shock arising on the occasion of the shifting-down to a low speed with which an engine brake effect is to be obtained from a high speed, for example, the shifting-down to the third speed from the fourth speed and also of keeping the engine brake effect contributive for causing the vehicle travelling at high speed to be slowed down appropriately when the shifting-down is carried out, the controller 200 is operative to supply a first group of control signals and a second group of control signals obtained selectively in response to the vehicle travelling speed to the solenoid valves 110b 120b and 130b when the shifting-down is performed, so that a first low speed with which the engine brake effect can be obtained is selected as the low speed (the third speed) of a target of the shifting-down in the power transmitting gear arrangement 10 when the vehicle travelling speed on the occasion of the shifting-down is equal to or higher than a predetermined speed and a second low speed which is provided with the same speed reduction ratio as the first low speed and with which the engine brake effect can not be obtained is selected as the low speed (the third speed) of a target of the shifting-down in the power transmitting gear arrangement 10 when the vehicle travelling speed on the occasion of the shifting-down is lower than the predetermined speed. For achieving such an operation, the turbine speed detecting portion 200a which serves as a revolving speed sensor for detecting the revolving speed of the input shaft (the tubular turbine shaft 13) or the output shaft (the central shaft 12) of the power transmitting gear arrangement 10 and the low speed selecting portion 200b which is operative to select the first low speed as the low speed of the target of the shifting-down when the revolving speed detected by the turbine speed detecting portion 200a is equal to or higher than a predetermined revolving speed and to select the first low speed as the low speed of the target of the shifting-down for a predetermined period Tx of time when the revolving speed detected by the turbine speed detecting portion 200a is lower than the predetermined revolving speed, are provided in the controller 200.

FIG. 3 shows an example of the flow of such control operation for supplying the first and second group of control signals to the solenoid valves 110b, 120b and 130b by the controller 200.

In this control operation, first the vehicle travelling speed signal Ss obtained from the speed sensor or the input shaft speed signal St obtained from the turbine speed sensor is stored in process P1. Next, it is checked based on the shift position signal Sr whether the fourth speed is selected in the power transmitting gear arrangement 10 or not in decision D1. If the fourth speed is not selected, the normal shift control is carried out in process P2 and then the step returns to the process P1. To the contrary, when the fourth speed is selected, it is checked based on the shift position signal Sr whether the selector valve 103 is in the D shift position or not, in other words, the shift range is the D range or not, in decision D2. When it is clarified in the decision D2 that the shift range is the D range, it is checked based on the overdrive indicating signal So whether the overdrive is selected, that is, the fourth speed is still selected in the power transmitting gear arrangement 10 or not in decision D3. Further, when it is clarified in the decision D3 that the overdrive is selected, it is checked based on the shift position signal Sr whether the shifting-down to the third speed from the fourthspeed is intended or not in decision D4. If it is clarified in the decision D4 that the shifting-down to the third speed from the fourth speed is not intended, the step is advanced to the process P2 in which the normal shift control is carried out and then returned to the process P1.

On the other hand, when it is clarified that the shift range is not the D range in the decision D2, that the overdrive is not selected in the decision D3, or that the shifting-down to the third speed from the fourth speed is intended in the decision D4, it is checked, based on the vehicle travelling speed signal Ss or the input shaft speed signal St stored in the process P1, that the vehicle travelling speed VN is equal to or higher than 40 km/h or not in decision D6. If the vehicle travelling speed VN is equal to or higher than 40 km/h, that is, the vehicle travels at high speed, the first group of control signals by which the solenoid valves 110b, 120b and 130b are deenergized, as shown in Table 2, are forwarded to the solenoid valves 110b, 120b and 130b in process P3, so that the first low speed with which the engine brake effect can be obtained is selected as the target of the shifting-down to the third speed from the fourth speed in the power transmitting gear arrangement 10. After that, the step returns to the process P1.

To the contrary, if it is clarified in the decision D6 that the vehicle travelling speed VN is lower than 40 km/h, that is, the vehicle travels at low speed, the second group of control signals by which the solenoid valves 110b and 120b are deenergized and the solenoid 130b is energized, as shown in Table 2, are forwarded to the solenoid valves 110b, 120b and 130b in process P4, so that the second low speed with which the engine brake effect can not be obtained is selected as the target of the shifting-down to the third speed from the fourth speed in the power transmitting gear arrangement 10.

TABLE 2

| | Solenoid valve 110b | Solenoid valve 120b | Solenoid valve 130b |
| --- | --- | --- | --- |
| First group of control signals | deenergized | deenergized | deenergized |
| Second group of control signals | deenergized | deenergized | energized |

Then, in decision D7, it is checked whether the period Tx of time has elapsed after the second group of control signals have been forwarded or not. If the period Tx of time has not elapsed yet, the step returns to the process P4 in which the second group of control signals are forwarded again. Then, when it is clarified that the period Tx of time has elapsed after the second group of control signals have been forwarded, the step is advanced to the process P3 in which the first group of control signals by which the solenoid valves 110b, 120b and 130b are deenergized, as shown in Table 2, are forwarded to the solenoid valves 110b, 120b and 130b in process P3, and then returns to the process P1.

The series connection of the first clutch 20 and the first one-way clutch device 22 is arranged in parallel with the second clutch device 21 as shown in FIG. 1. Therefore, a first power transmitting path passing through the series connection of the first clutch device and the first one-way clutch 22 and a second power transmitting path passing through the second clutch 21 can be selectively made.

As described above, when the vehicle travelling speed is equal to or higher than the predetermined speed (40 km/h) on the occasion of the shifting-down to the third speed from the fourth speed, the solenoid valve 130b is deenergized to keep the second clutch device 21 being supplied with the operation oil and the second clutch device 21 is in its engaging state. Accordingly, the first one-way clutch device 22 is locked to give rise to engine brake, so that the shifting-down to the third speed from the fourth speed is carried out with the engine brake effect contributive for reducing appropriately the vehicle travelling speed. Further, when the vehicle travelling speed is lower than the predetermined speed (40 km/h) on the occasion of the shifting-down to the third speed from the fourth speed, the solenoid valve 130b is energized to drain the operation oil from the second clutch device 21 and the second clutch device 21 is in its disengaging state. Likewise, the first one-way clutch device 22 is released to make the engine brake ineffective, so that the shifting-down to the third speed from the fourth speed is carried out without the shock contingent to the engine brake effect.

In the embodiment shown in FIGS. 1 and 2, the N-D accumulator 144 is provided to be connected with lines for supplying the operation oil to the first and second clutch devices 20 and 21 for delaying slightly the supply of the operation oil to the second clutch device 21 compared with the supply of the operation oil to the first clutch device 20. With such a control by the N-D accumulator 144, the second clutch device 21 is prevented from being engaged prior to the engagement of the first clutch device 20 and thereby worn abnormally when the selector valve 103 is moved to the D shift position from the n shift position under the situation wherein the throttle opening degree is rapidly increased.

Further, a lock-up control valve 151 is provided in a line for supplying the operation oil to the lock-up clutch device 29. In the lock-up control valve 151, the hydraulic pressure of the operating oil supplied through the line is applied to act against the total amount of the hydraulic pressure produced by a spring contained in the lock-up control valve 151 and the hydraulic pressure applied to the first clutch device 20. The lock-up clutch device 29 is provided with an applying chamber and a releasing chamber each connected to the lock-up control valve 151. When the operation oil in the releasing chamber of the lock-up clutch device 29 is drained through the lock-up control valve 151 controlled by a solenoid valve 151a which is in its energized state, the lock-up clutch 29 is in the lock-up state.

In the embodiment, a neutral valve 160 is also provided for coupling a line l3 connected to the first clutch device 20 selectively with a line l4 connected to the port a of the selector valve 103 and a line l5 connected to the port d of the selector valve 103. The neutral valve 160 is supplied with the operation oil through the pressure line 101, and in the neutral valve 160, the hydraulic pressure of the operation oil from the pressure line 101 acts against the hydraulic pressure produced by a spring 160a contained in the neutral valve 160. A solenoid valve 161 is provided in a potion of the pressure line 101 for supplying the operation oil to the neutral valve 160. When the solenoid valve 161 is deenergized, a spool 160b provided in the neutral valve 160 is placed at such a position in the right side as shown in FIG. 1 to couple the line l3 with the line l4, so that the operation oil discharged from the port a of the selector valve 103 is supplied to the first clutch device 20. On the other hand, when the solenoid valve 161 is energized, the operation oil is drained through the solenoid valve 161 from the neutral valve 160 and thereby the spool 160a is moved to the left in the drawing to disconnect the line l3 from the line l4 and instead to couple the line l3 with the line l5.

The port d of the selector valve 103 which is connected to the line l5 drains therethrough the operation oil from the neutral valve 160 when the selector valve 103 is in the D shift position. Therefore, when the vehicle travels with the shift position selecting the D range, the operation oil in the first clutch device 20 is drained through the neutral valve 160 and the selector valve 103 so that the first clutch device 20 is disengaged and as a result vibrations arising on the vehicle in the D range travelling condition are restricted. Further, when the selector valve 103 is in a forward shift position other than the D shift position, such as the 1st or 2nd shift position, the port d of the selector valve 103 is communicated with the port g of the selector valve 103 to be supplied with the operation oil therefrom. Accordingly, the operation oil is supplied from the port d through the neutral valve 160 to the first clutch device 20 and the first clutch device 20 is engaged so as to have the vehicle travelled forward. In such a situation, the port d of the selector valve 103 is disconnected from the drain path.

What is claimed is:

1. A control system for an automatic transmission employed in a vehicle comprising;

a torque converter coupled with an output shaft of an engine, a power transmitting gear arrangement disposed at an output end of the torque converter, speed change means for changing over power transmitting paths to one from another in said power transmitting gear arrangement to give rise to speed change, a valve arrangement for controlling an operation fluid to be supplied to and drained from said speed change means, revolving speed sensing means for detecting the revolving speed of one of input and output portions of said power transmitting gear arrangement when the shifting-down to a low speed with which an engine brake effect is to be obtained from a high speed in said power transmitting gear arrangement is carried out; and control means for selecting directly a first low speed with which the engine brake effect can be obtained as the low speed of a target of the shifting-down when the revolving speed detected by said revolving speed sensing means is not lower than a predetermined revolving speed and for selecting a second low speed which is provided with the same speed reduction ratio as said first low speed and with which the engine brake effect can not be obtained as the low speed of a target of the shifting-down for a predetermined period of time and then making a shift from said second low speed to said first low speed following said predetermined period of time when the revolving speed detected by said revolving speed sensing means is lower than said predetermined revolving speed.

2. A control system according to claim 1, wherein said control means comprises valve control means for casing said valve arrangement to control said speed change means in such a manner that said first and second low speeds are obtained selectively in said power transmitting gear arrangement.

3. A control system according to claim 1, wherein said control means comprises speed setting means for setting the highest speed in said power transmitting gear arrangement as said high speed and also setting the second highest speed in said power transmitting gear arrangement as each of said first and second low speed.

4. A control system according to claim 1, wherein said torque converter and said power transmitting gear arrangement are so connected to each other that the revolving speed detected by said revolving speed sensing means is in proportion to the vehicle travelling speed.

5. A control system according to claim 2, wherein said speed change means comprises a plurality of clutch devices and a plurality of brake devices for making fundamentally four forward speeds in said power transmitting gear arrangement, said four forward speeds being expanded through the operation of said valve arrangement to variations of speed more than four which includes said first and second low speeds.

6. A control system according to claim 2, wherein said control means comprises speed setting means for setting the highest speed in said power transmitting gear arrangement as said high speed and also setting the second highest speed in said power transmitting gear arrangement as each of said first and second low speed.

7. A control system according to claim 3, wherein said speed change means comprises a one-way clutch device for contributing to the selection of said first low speed in said power transmitting gear arrangement by means of being locked and for contributing also to the selection of said second low speed in said power transmitting gear arrangement by means of being released from locking.

* * * * *